(12) United States Patent
Konik et al.

(10) Patent No.: US 8,812,489 B2
(45) Date of Patent: Aug. 19, 2014

(54) SWAPPING EXPECTED AND CANDIDATE AFFINITIES IN A QUERY PLAN CACHE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/646,971

(22) Filed: Oct. 8, 2012

(65) Prior Publication Data

US 2014/0101131 A1    Apr. 10, 2014

(51) Int. Cl.
*G06F 7/00* (2006.01)
*G06F 17/00* (2006.01)

(52) U.S. Cl.
USPC .......................................................... 707/718

(58) Field of Classification Search
None
See application file for complete search history.

(56) References Cited

U.S. PATENT DOCUMENTS

| | | | | |
|---|---|---|---|---|
| 5,812,996 | A * | 9/1998 | Rubin et al. ............................ | 1/1 |
| 8,229,917 | B1 * | 7/2012 | Aneas et al. ................... | 707/713 |
| 2002/0032835 | A1 | 3/2002 | Li et al. | |
| 2005/0071564 | A1 | 3/2005 | Luick | |
| 2005/0091196 | A1 * | 4/2005 | Day et al. ............................ | 707/3 |
| 2006/0004695 | A1 * | 1/2006 | Day et al. ............................ | 707/2 |
| 2006/0294079 | A1 * | 12/2006 | Dettinger et al. .................. | 707/3 |
| 2007/0136238 | A1 * | 6/2007 | Bildhaeuser et al. ............. | 707/2 |
| 2007/0208690 | A1 * | 9/2007 | Schneider et al. ................. | 707/2 |
| 2008/0091642 | A1 * | 4/2008 | Bestgen et al. ..................... | 707/2 |
| 2008/0172369 | A1 * | 7/2008 | Baranczyk et al. ............... | 707/4 |
| 2008/0177694 | A1 * | 7/2008 | Chaudhuri et al. ............... | 707/2 |
| 2008/0195578 | A1 * | 8/2008 | Hueske et al. ..................... | 707/2 |
| 2008/0222093 | A1 * | 9/2008 | Fan et al. ........................... | 707/2 |
| 2009/0094191 | A1 * | 4/2009 | Chaudhuri et al. ............... | 707/2 |
| 2009/0100004 | A1 * | 4/2009 | Andrei et al. ..................... | 707/2 |
| 2009/0100114 | A1 * | 4/2009 | Bestgen et al. ............... | 707/204 |
| 2009/0182720 | A1 * | 7/2009 | Cain et al. .......................... | 707/4 |
| 2009/0276394 | A1 * | 11/2009 | Bestgen et al. .................. | 707/2 |
| 2009/0327242 | A1 * | 12/2009 | Brown et al. ..................... | 707/3 |
| 2010/0287206 | A1 * | 11/2010 | Cain et al. ..................... | 707/802 |
| 2010/0306188 | A1 * | 12/2010 | Cunningham et al. ........ | 707/713 |
| 2011/0029508 | A1 * | 2/2011 | Al-Omari et al. ............. | 707/718 |
| 2011/0035369 | A1 * | 2/2011 | Halasipuram et al. ........ | 707/720 |
| 2011/0072006 | A1 * | 3/2011 | Yu et al. ........................ | 707/718 |
| 2011/0258628 | A1 * | 10/2011 | Devadhar ..................... | 718/100 |

OTHER PUBLICATIONS

Shared Query Plan Caching in CUBRID, http://www.cubrid.org/wiki_tutorials/entry/shared-query-plan-caching-in-CUBRID, printed on May 15, 2012, pp. 1-8.

(Continued)

*Primary Examiner* — Robert Beausoliel, Jr.
*Assistant Examiner* — Nicholas Allen
(74) *Attorney, Agent, or Firm* — Kevin D. Kehe; James R. Nock (57) ABSTRACT

In an embodiment, a hit percentage of an expected affinity for a first query is calculated, wherein the expected affinity comprises a first address range in a query plan cache, a hit percentage of a candidate affinity for the first query is calculated, wherein the candidate affinity comprises a second address range in a query plan cache, and if the hit percentage of the candidate affinity is greater than the hit percentage of the expected affinity by more than a threshold amount, query plans in the candidate affinity are swapped with query plans in the expected affinity.

20 Claims, 6 Drawing Sheets

(56) References Cited

OTHER PUBLICATIONS

Kazutomo Yoshii et al., Characterizing the Performance of "Big Memory" on Blue Gene Linux, 2009 International Conference on Parallel Processing Workshops, http://www.mcs.anl.gov/research/projects/iofsl/zeptoos/publications/2009_p2s2_bigmem.pdf, 2009, pp. 65-72.

Jonathan Corbet, Transparent Huge Pages in 2.6.38, http://lwn.net/Articles/423584, Jan. 19, 2011, pp. 1-3.

* cited by examiner

| | | AFFINITY DATA 262 | | | |
|---|---|---|---|---|---|
| 402 | 404 | 406 | 408 | 410 | 412 |
| QUERY ID | EXPECTED AFFINITY ID | EXPECTED AFFINITY HIT/TOTAL | CANDIDATE AFFINITY ID | CANDIDATE AFFINITY HIT/TOTAL | QPLAN POINTER |
| QP1 | YELLOW SCHEMA | 23/24 | USER C | 5/24 | PTR1 |
| QP2 | YELLOW SCHEMA | 10/30 | USER C | 12/30 | PTR2 |
| QP3 | YELLOW SCHEMA | 25/45 | USER C | 4/45 | PTR3 |
| QP4 | GREEN SCHEMA | 26/52 | USER C | 14/52 | PTR4 |
| QP5 | GREEN SCHEMA | 1/20 | USER C | 19/20 | PTR5 |
| QP6 | RED SCHEMA | 98/99 | USER C | 5/99 | PTR6 |
| QP7 | RED SCHEMA | 97/100 | USER C | 3/100 | PTR7 |
| QP8 | RED SCHEMA | 44/50 | USER C | 6/50 | PTR8 |
| QP9 | APPLICATION A | 2/3 | YELLOW SCHEMA | 1/3 | PTR9 |
| QP10 | APPLICATION A | 7/11 | RED SCHEMA | 4/11 | PTR10 |
| QP11 | APPLICATION B. USER A | 1/3 | YELLOW SCHEMA | 2/3 | PTR11 |
| QP12 | APPLICATION B. USER A | 2/6 | GREEN SCHEMA | 5/6 | PTR12 |
| QP13 | APPLICATION B. USER B | 11/54 | YELLOW SCHEMA | 4/54 | PTR13 |
| QP14 | USER C | 5/9 | RED SCHEMA | 2/9 | PTR14 |

SWAPPING EXPECTED AND CANDIDATE AFFINITIES IN A QUERY PLAN CACHE

FIELD

This invention generally relates to computer database management systems and more specifically relates to query plans in a query plan affinity cache.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name or identifier within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as a query plan (QP), a query execution plan (QEP), a query access plan (QAP), or an access plan (AP). The DBMS often saves the query plan and reuses it when the user or requesting program repeats the query, which is a common occurrence, instead of undergoing the time-consuming process of recreating the query plan.

The DBMS may create many different access plans for any one query, each of which returns the required data set, yet the different access plans may provide widely different performance. Thus, especially for large databases, the access plan selected by the DBMS needs to provide the required data at a reasonable cost, in terms of time and hardware resources. Hence, the DBMS often creates multiple prospective access plans and then chooses the best, or least expensive one, to execute.

SUMMARY

A method, computer-readable storage medium, and computer system are provided. In an embodiment, a hit percentage of an expected affinity for a first query is calculated, wherein the expected affinity comprises a first address range in a query plan cache, a hit percentage of a candidate affinity for the first query is calculated, wherein the candidate affinity comprises a second address range in a query plan cache, and if the hit percentage of the candidate affinity is greater than the hit percentage of the expected affinity by more than a threshold amount, query plans in the candidate affinity are swapped with query plans in the expected affinity.

It is to be noted, however, that the appended drawings illustrate only example embodiments of the invention, and are therefore not considered a limitation of the scope of other embodiments of the invention.

DETAILED DESCRIPTION

Figure 1:
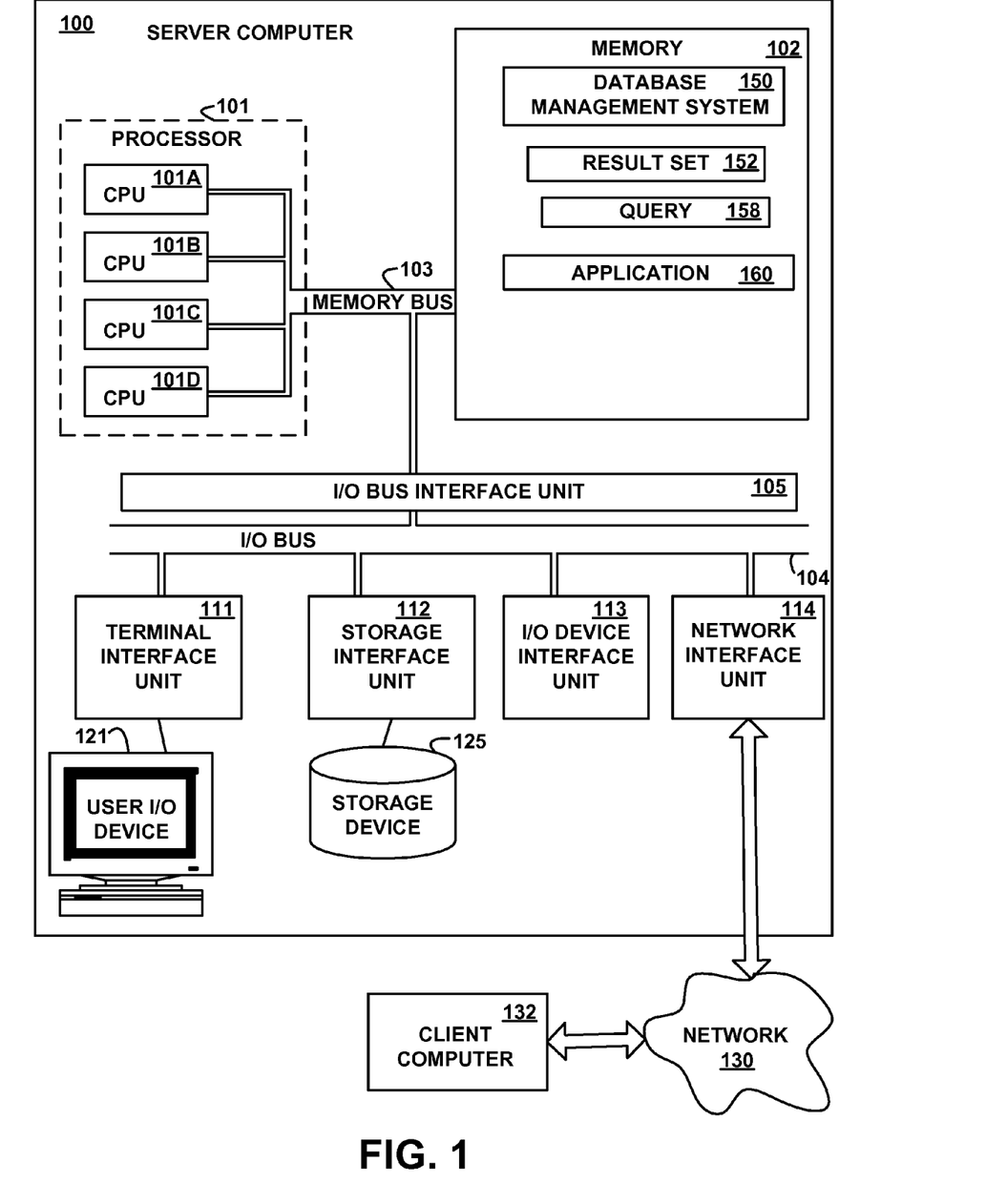
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, a result set 152, a query 158, and an application 160. Although the database management system 150, the result set 152, the query 158, and the application 160 are illustrated as being contained within the memory 102 in the server computer system 100, in other embodiments some or all of them may be on different computer systems and may be accessed remotely, e.g., via the network 130. For example, the database management system 150, the result set 152, the query 158, and the application 160 may be stored in memory in the client computer system 132. The server computer system 100 may use virtual addressing mechanisms that allow the programs of the server computer system 100 to behave as if they only have access to a large, single storage entity instead of access to multiple, smaller storage entities. Thus, while the database management system 150, the result set 152, the query 158, and the application 160 are illustrated as being contained within the memory 102, these elements are not necessarily all completely contained in the same storage device at the same time. Further, although the database management system 150, the result set 152, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, and 6. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data, in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and client computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In an embodiment, the application 160 may be stored in a storage device at the client computer system 132, may execute on a processor at the client computer system 132, and may send the queries 158 to and receive the result sets 152 from the server computer system 100 via the network 130.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
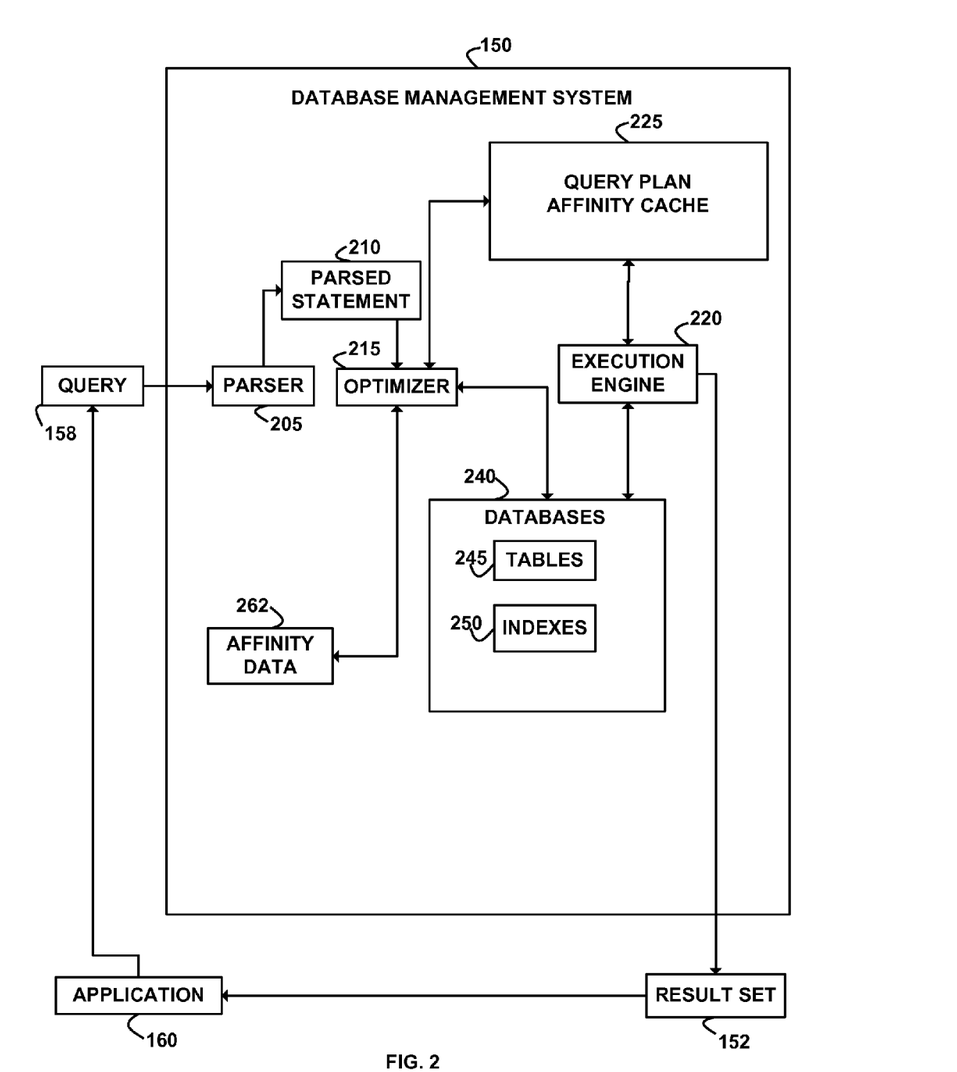
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, an optimizer 215, an execution engine 220, a query plan affinity cache 225, a database 240, and affinity data 262. In another embodiment, the affinity data 262 is stored in the query plan affinity cache 225.

The database 240 comprises tables 245, and optional indexes 250. The tables 245 organize data in rows, which represent individual entries, tuples, or records and columns, fields, or attributes, which define what is stored in each row, entry, tuple, or record. Each table 245 has a unique name or identifier within a database 240 (but not necessarily a unique name across all databases) and each column has a unique name within the particular table 245. The indexes 250 are data structures that inform the DBMS 150 of the location of a certain row in a table 245, in response to the indexes 250 receiving an indexed column value.

The parser 205 in the DBMS 150 receives the query 158 from the application 160. The query 158 requests that the DBMS 150 search for or find a row or combination of rows of data from the tables 245 and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158 or whether different values are passed into the query 158 via parameter markers or host variables. In an embodiment, the application 160 sends different queries 158 to the DBMS 150. The parser 205 generates a parsed statement 210 from the query 158, which the parser 205 sends to the optimizer 215. The optimizer 215 performs query optimization on the parsed statement 210. As a part of query optimization, the optimizer 215 generates one or more query plans and stores them to the query plan affinity cache 225, using the data in the affinity data 262 and using data such as resource availability, platform capabilities, query content information, etc., that is stored in the database 240.

The execution engine 220 reads the selected query plan from the query plan affinity cache 225 and executes the selected query plan, optionally using the indexes 250, in order to find and retrieve the data from the tables 245 that satisfies the criteria of the query 158. The execution engine 220 stores the resultant data that satisfies the criteria specified by the query 158 into the result set 152, which the DBMS 150 returns to the application 160, as a response to the query 158.

Although FIG. 2 illustrates the query plan affinity cache 225 as being contained within the DBMS 150, in another embodiment, the application 160 comprises the query plan affinity cache 225. In various embodiments, each application 160 has its own query plan affinity cache 225 within the respective application 160, each application 160 has its own query plan affinity cache 225 outside the respective application 160, or the applications 160 share the same query plan affinity cache 225. The query plan affinity cache 225 may be scoped system wide, application wide, object wide, to a thread, or any other scoping criteria. In various embodiments, the application 160 is a user application, a third-party application, an operating system, or any portion, multiple, or combination thereof. In an embodiment, the query plan affinity cache 225 may be in an SQL (Structured Query Language) package. In various embodiment, the query plan affinity cache 225 may be stored on the same server computer system 100 as the DBMS 150, may execute in the same or a different virtual machine as the DBMS 150, or may be stored on a different computer from the DBMS 150 and accessed, e.g., via the network 130.

Figure 3:
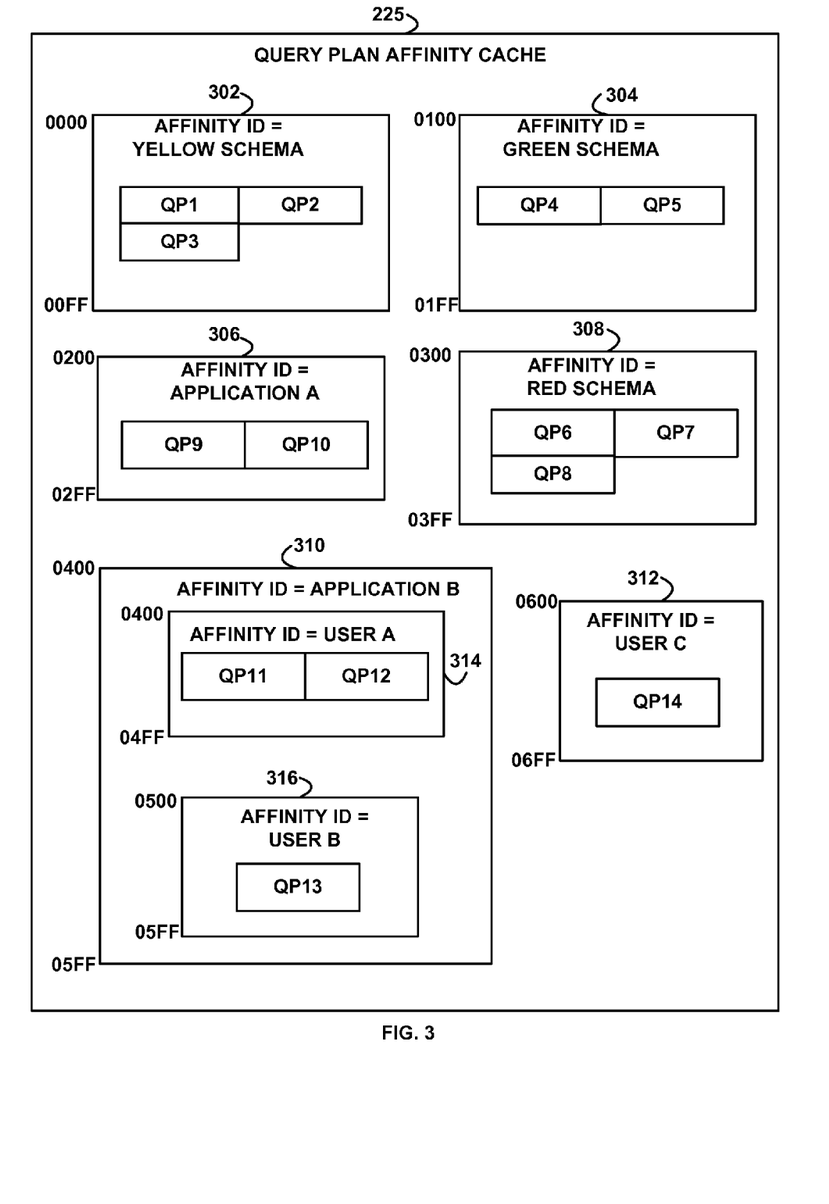
FIG. 3 depicts a block diagram of an example query plan affinity cache, according to an embodiment of the invention.

FIG. 3 depicts a block diagram of an example query plan affinity cache 225, according to an embodiment of the invention. The example query plan affinity cache 225 comprises example affinities 302, 304, 306, 308, 310, 312, 314, and 316. Each of the affinities 302, 304, 306, 308, 310, 312, 314, and 316 is identified by a respective affinity identifier and is stored in the query plan affinity cache 225 at a respective contiguous (virtual or physical) address range or a respective set of virtual or physical pages, in the memory 102, on the storage devices 125, or both. In an embodiment, the address ranges at which the affinities are stored are non-overlapping, e.g., the address range (0000 through 00FF) of the affinity 302 does not overlap with the address range (0100 through 01FF) of the affinity 304. In another embodiment, some or all of the affinities are organized in a nested or hierarchical organization, at any number of nesting levels, so that the address ranges of some of the affinities are included within the address ranges of other affinities. For example, the address range (0400 through 04FF) of the affinity 314 is included within the address range (0400 through 05FF) of the affinity 310, and the address range (0500 through 05FF) of the affinity 316 is included within the address range (0400 through 05FF) of the affinity 310, but the address range (0400 through 04FF) of the affinity 314 does not overlap the address range (0500 through 05FF) of the affinity 316.

Each of the affinities 302, 304, 306, 308, 310, 312, 314, and 316 comprises one or more query plans, which are stored at addresses that are within the address range (greater than or equal to the lower bound of the address range and less than or equal to the upper bound of the address range) of the respective affinity. For example, the affinity 302 comprises query plans QP1, QP2, and QP3, which are stored at addresses that are within the range of 0000 through 00FF. The query plans, when executed by the execution engine 220, implement respective queries 158.

In an embodiment, each of the query plans comprise respective join trees, which specify the respective internal steps that the DBMS 150 reads and executes, in order to create the result set 152 that satisfies or meets the criteria specified by the query 158. These internal steps may comprise an identification of the table or tables specified in the query 158, the values in the row or rows to be selected by the query 158, and other information such as whether to use an existing index, whether to build a temporary index, whether to scan each table (read the table in storage address order) or use an index to randomly access the table, whether to use a temporary file to execute a sort or hash, and/or the order in which the tables are to be joined together to satisfy the query 158.

In response to a query 158 that requests data from multiple tables, the DBMS 150 joins tuples from these multiple tables (the tuples are often concatenated horizontally in the result set 152) in a join order, so as to find and retrieve the data from all the tables. Thus, a join operation is a relationship between two tables accessed by a query (a join query), and the DBMS 150 performs a join operation to connect (or join) data from two or more tables, wherein the DBMS 150 joins together the tuples with matching attributes, in order to form a new tuple. The join order is the order in which the DBMS 150 performs the join operations, in order to retrieve and join rows of data from the database tables into the result set 152. In an embodiment, the join trees are represented as tree graphs with nodes that identify tables used by the query and connections between the nodes that identify the join order of the rows returned from the tables. In other embodiments, the join trees may be represented via any appropriate technique.

Figure 4:
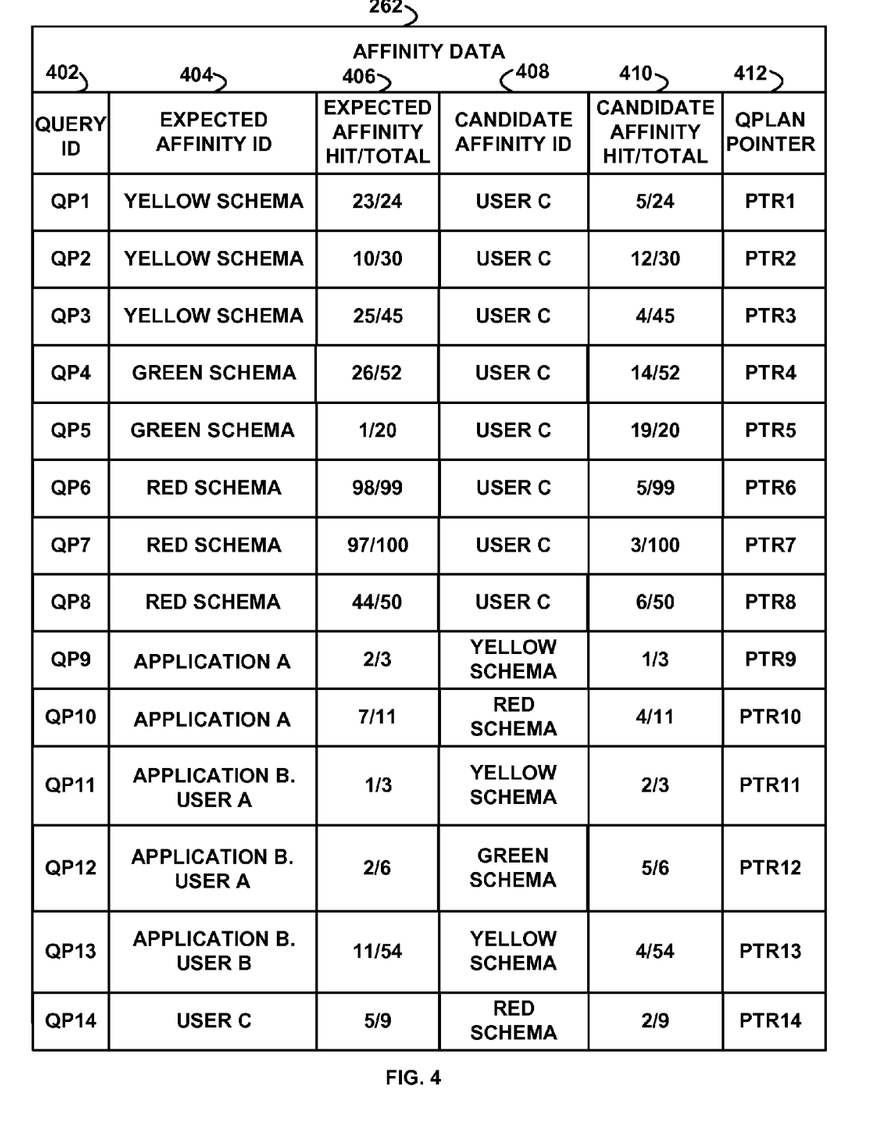
FIG. 4 depicts a block diagram of an example data structure for affinity data, according to an embodiment of the invention.

FIG. 4 depicts a block diagram of an example data structure for affinity data 262, according to an embodiment of the invention. The affinity data 262 comprises any number of entries, each of which comprises a query identifier field 402, an expected affinity identifier field 404, an expected affinity hit/total field 406, a candidate affinity identifier field 408, a candidate affinity hit/total field 410, and a query plan (QPLAN) pointer field 412.

The query identifier field 402, in each entry, uniquely identifies a query 158. The expected affinity identifier field 404, in each entry, identifies the affinity, such as the affinity 302, 304, 306, 308, 310, 312, 314, or 316, in which the DBMS 150 expects to find the query plan that implements the query 158 identified by the query identifier 402, in the same entry.

The expected affinity hit/total field 406, in each entry, specifies the expected affinity hit count and the expected affinity total count. The expected affinity hit count, in each entry, is the number of times that the DBMS 150 has found the query plan (that implements the query identified by the query identifier field 402, in the same entry) in the affinity identified by the expected affinity identifier field 404, in the same entry. The expected affinity total count, in each entry, is the number of times that the DBMS 150 has received the query identified by the query identifier field 402, in the same entry.

The candidate affinity identifier field 408, in each entry, identifies the affinity, such as the affinity 302, 304, 306, 308, 310, 312, 314, or 316, in which the DBMS 150 expects to find the query plan that implements the query 158 identified by the query identifier 402, in the same entry if the query plan is not found in the expected affinity identified by the expected affinity identifier field 402, in the same entry. In an embodiment, an affinity may be an expected affinity for a first set of queries, a candidate affinity for a second set of queries, and neither an expected affinity nor a candidate affinity for a third set of queries.

The candidate affinity hit/total field 410, in each entry, specifies the candidate affinity hit count and the candidate affinity total count. The candidate affinity hit count, in each entry, is the number of times that the DBMS 150 has found the query plan (that implements the query identified by the query identifier field 402, in the same entry) in the affinity identified by the candidate affinity identifier field 408, in the same entry. The candidate affinity total count, in each entry, is the number of times that the DBMS 150 has received the query identified by the query identifier field 402, in the same entry. In an embodiment, the expected affinity total count and the candidate affinity total count are identical, and both indicate the total number of the queries identified by the query identifier 402, in the same entry, received by the DBMS 150.

The query plan (QPLAN) pointer field 412, in each entry, specifies the address (within the query plan affinity cache 225) of the query plan that implements the query identified by the query identifier 402, in the same entry. In various embodiments, the query plan pointer field 412, in each entry, may specify an address that is within the address range of the affinity identified by the expected affinity identifier field 404, in the same entry; may specify an address that is within the address range of the affinity identified by candidate affinity identifier field 408, in the same entry; or may specify an address that is within an address range of an affinity that is different from both the affinity identified by the expected affinity identifier field 404 and different from the affinity identified by the candidate affinity identifier field 408, in the same entry.

Figure 5:
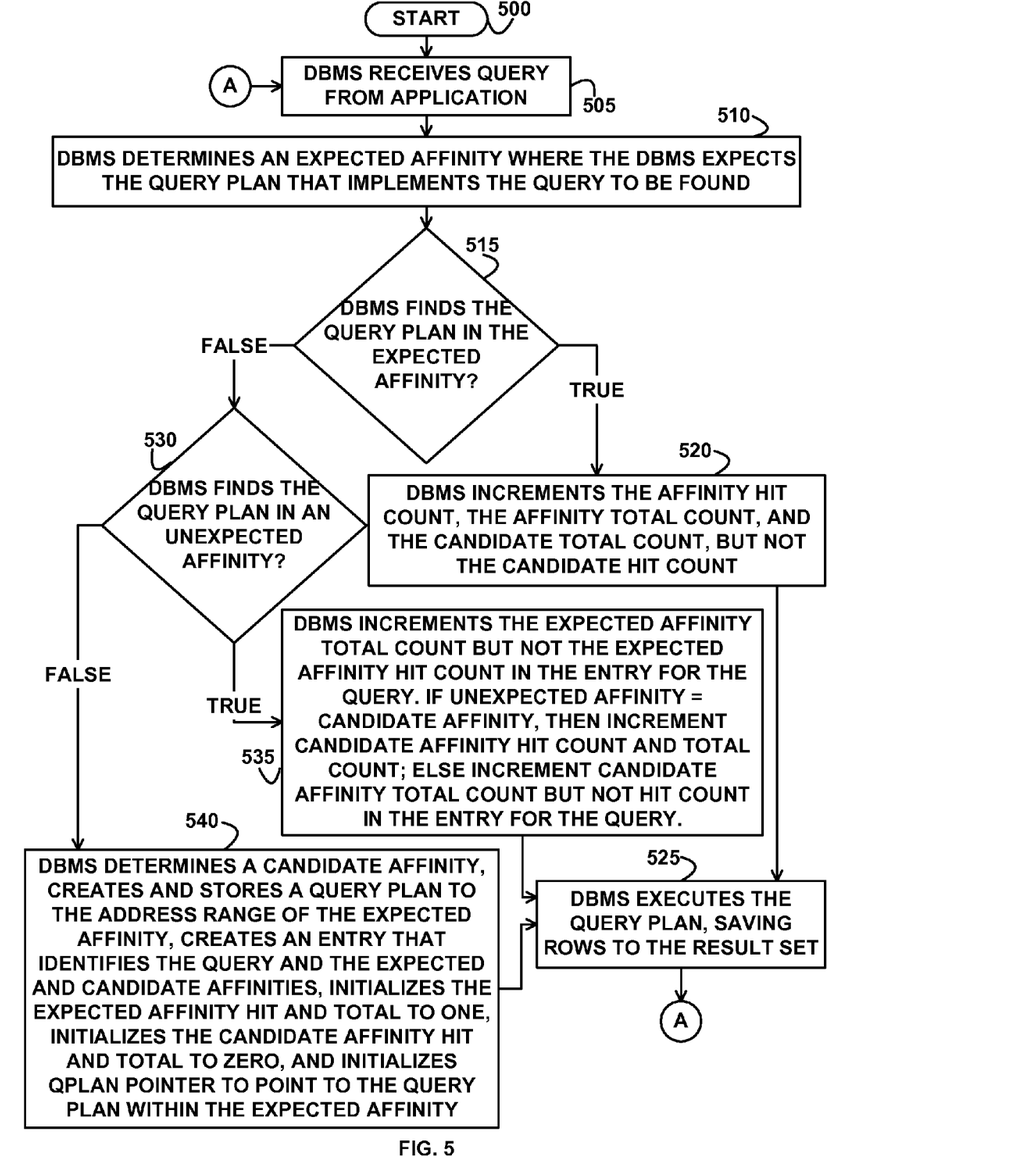
FIG. 5 depicts a flowchart of example processing for a query, according to an embodiment of the invention.

FIG. 5 depicts a flowchart of example processing for a query, according to an embodiment of the invention. Control begins at block 500. Control then continues to block 505 where the DBMS 150 receives a query 158 from an application 160. Control then continues to block 510 where the DBMS 150 determines an expected affinity where the DBMS 150 expects the query plan that implements the received query 158 to be found or located. In an embodiment, the DBMS 150 determines the expected affinity from a default affinity. In various embodiments, the DBMS 150 determines that all queries from the same application have the same expected affinity, all queries from the same user have the same expected affinity, or all queries that specify the same database tables, schema, directory, or catalog have the same affinity. In an embodiment, the DBMS 150 determines that all queries have the same expected affinity. In an embodiment, the DBMS 150 reads the expected affinity from the user I/O device 121 or receives the expected affinity from the application 160, from the network 130, from the client computer system 132, or from a designer of the DBMS 150. In an embodiment, the DBMS 150 selects the expected affinity that has the largest expected affinity hit percentage (expected affinity hit count divided by expected affinity total count) of all historical expected affinities in which the query plan that implemented the query identified by the query identifier 402, in the same entry, was stored.

Control then continues to block 515 where the DBMS 150 determines whether the query plan that implements the query is located or stored in the expected affinity. In an embodiment, the DBMS 150 makes the determination of block 515 by determining whether the address specified by the query plan pointer 412 in the entry with a query identifier 402 that matches the received query is within the address range of the affinity identified by the expected affinity identifier field 404, in the same entry. If the determination at block 515 is true, then the query plan that implements the query is located in the expected affinity, so control continues to block 520 where the DBMS 150 increments the affinity hit count, the affinity total count, and the candidate total count, but not the candidate hit count, in the entry in the affinity data 262 that comprises a query identifier 402 that matches the received query. Control then continues to block 525 where the DBMS 150 executes the found query plan, saving rows that satisfy the criteria of the query to the result set 152 and sends the result set 152 to the application 160 from which the DBMS 150 received the query 158. Control then returns to block 505 where the DBMS 150 receives the same or a different query from the same or a different application, as previously described above.

If the determination at block 515 is false, then the query plan that implements the query is not located in the expected affinity, so control continues to block 530 where the DBMS 150 determines whether the query plan that implements the query is found in any affinity other than the expected affinity (whether the query plan is found in an unexpected affinity). In an embodiment, the DBMS 150 makes the determination of block 530 by determining whether the address specified by the query plan pointer 412 in the entry with a query identifier 402 that matches the received query is within the address range of any affinity (other than the affinity specified by the expected affinity identifier 404, in the same entry).

If the determination at block 530 is true, then the query plan that implements the query is found in an affinity other than the expected affinity (the query plan is found in an unexpected affinity), so control continues to block 535 where the DBMS 150 increments the expected affinity total count but not the expected affinity hit count in the entry in the affinity data 262 with a query identifier 402 that matches the received query. If the unexpected affinity in which the query plan was found is equal to (is the same as) the candidate affinity specified by the candidate affinity identifier 408, in the same entry, then the DBMS 150 increments the candidate affinity hit count and the candidate total count. If the unexpected affinity in which the query plan was found is not equal to (is different from) the candidate affinity specified by the candidate affinity identifier 408, in the same entry, then the DBMS 150 increments the candidate affinity total count but does not increment in the candidate hit count in the entry with the query identifier 402 that matches the received query. Control then continues to block 525, as previously described above.

If the determination at block 530 is false, then the query plan that implements the query is not found in any affinity, so control continues to block 540 where the DBMS 150 determines a candidate affinity for the query, creates and stores a query plan that implements the query to the address range of the expected affinity, creates an entry in the affinity data 262 that identifies the query, the expected affinity, and the candidate affinity, initializes the expected affinity hit count and the expected affinity total count to one, initializes the candidate affinity hit count and the candidate affinity total count to zero, and initializes the query plan pointer 412 to comprise the address of the query plan within the address range of the expected affinity. In an embodiment, the DBMS 150 selects the candidate affinity that has the largest candidate affinity hit percentage (the candidate affinity hit count divided by the candidate affinity total count) of all historical candidate affinities in which the query plan that implemented the query identified by the query identifier 402, in the same entry, was stored. Control then continues to block 525, as previously described above.

Figure 6:
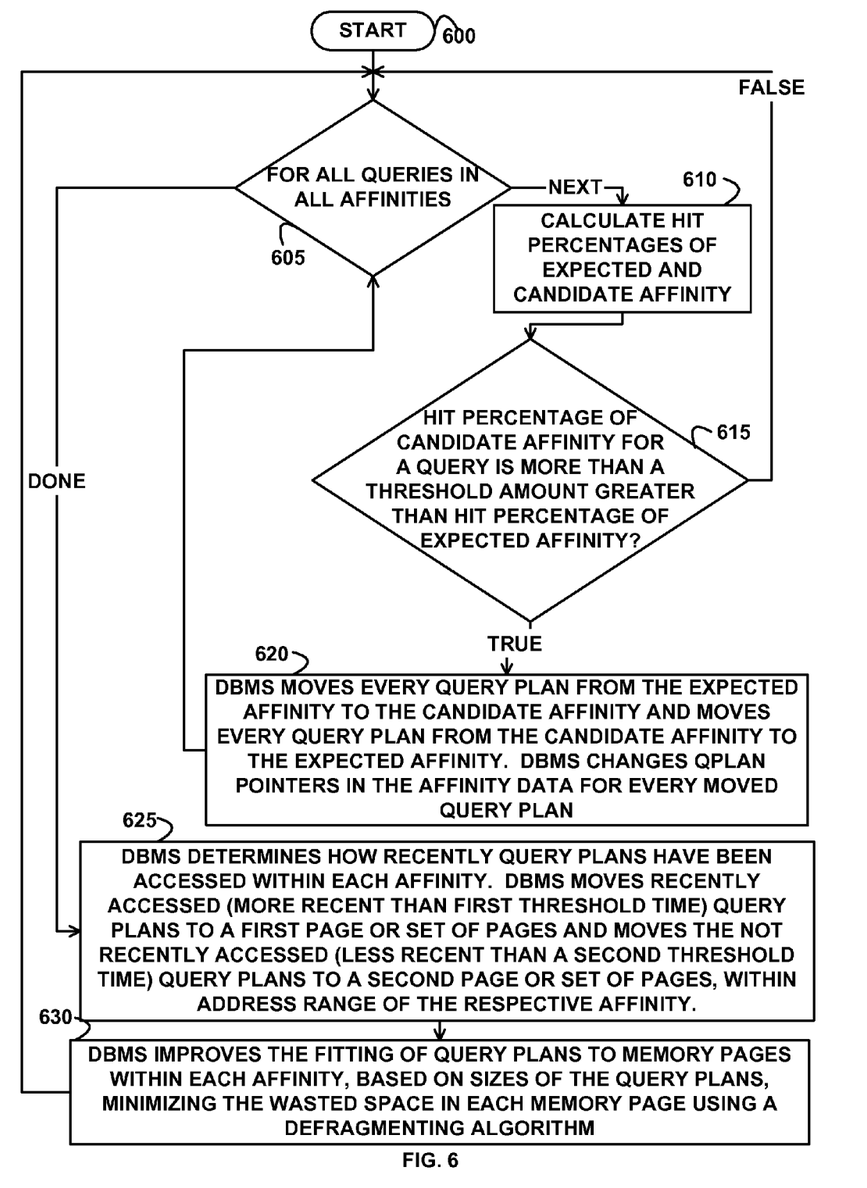
FIG. 6 depicts a flowchart of example processing for a query plan affinity cache, according to an embodiment of the invention.

FIG. 6 depicts a flowchart of example processing for a query plan affinity cache, according to an embodiment of the invention. In various embodiments, the processing of FIGS. 5 and 6 execute concurrently, substantially concurrently, or interleaved on the same or different of the processors 101 via multi-threading, multi-processing, time-slicing, or multi-programming techniques. Control begins at block 600. Control then continues to block 605 where the DBMS 150 begins a loop that executes for each query in each affinity, once for each entry in the affinity data 262. So long as an entry in the affinity data 262 remains unprocessed by the loop that starts at block 605, control continues from block 605 to block 610 where the DBMS 150 calculates the hit percentages of the expected affinity and the candidate affinity. In an embodiment, the DBMS 150 calculates the hit percentages by dividing the expected affinity hit count by the expected affinity total count to yield the hit percentage of the expected affinity and by dividing the candidate affinity hit count by the candidate affinity total count to yield the hit percentage of the candidate affinity.

Control then continues to block 615 where the DBMS 150 determines whether the hit percentage of the candidate affinity for the query is more than a threshold amount greater than the hit percentage of the expected affinity. In various embodiments, the DBMS 150 receives various threshold amounts from a designer of the DBMS 150, from the user I/O device 121, from the network 130, from the client computer system 132, or from the application 160. If the determination at block 615 is true, then the hit percentage of the candidate affinity for the query is more than a threshold amount greater than the hit percentage of the expected affinity, so control continues to block 620 where the DBMS 150 swaps the query plans in the expected affinity and the candidate affinity. That is, the DBMS 150 moves every query plan from the expected affinity to the candidate affinity and moves every query plan from the candidate affinity (that existed in the candidate affinity prior to the move of the query plans from the expected affinity to the candidate affinity) to the expected affinity. DBMS 150 changes the query plan pointers 412 in the entries in the affinity data 262 for every moved query plan to comprise the new addresses of the swapped query plans. Control then returns to block 605 where the DBMS 150 starts processing of the next entry in the affinity data 262, as previously described above.

If the determination at block 615 is false, then the hit percentage of the candidate affinity for the query is not more than a threshold amount greater than the hit percentage of the expected affinity, so control returns to block 605 where the DBMS 150 starts processing of the next entry in the affinity data 262, as previously described above.

After all entries have been processed by the loop that starts at block 605, control continues from block 605 to block 625 where the DBMS 150 determines how recently the query plans have been accessed within each affinity (each affinity may be an expected affinity, a candidate affinity, or neither an expected affinity nor a candidate affinity). The DBMS 150 moves the recently accessed (more recently accessed than a first threshold time) query plans to a first contiguous address range, a first memory or storage device page, or a first set of memory or storage device pages within the respective affinity and moves the not recently accessed (less recently accessed than a second threshold time) query plans to a second contiguous address range, a second memory or storage device page, or a second set of memory or storage device pages, within the address range of the affinity. The first contiguous address range is different from and not overlapping with the second contiguous address range, within each respective affinity.

Control then continues to block 630 where the DBMS 150 improves the fitting of query plans to memory pages within each affinity, based on sizes of the query plans, minimizing the wasted space in each memory page using a defragmenting algorithm. A defragmenting algorithm physically organizes or moves the contents of an affinity into the smallest number of contiguous regions (fragments).

Control then returns to block 605, where the loop that processes all entries in the affinity data 262 restarts from the beginning of the affinity data 262, as previously described above.

In this way, in an embodiment, the DBMS moves frequently or recently used query plans to proximate address ranges in the query plan cache and moves infrequently or not recently used query plans to other address ranges in the query plan cache, which reduces thrashing and increases performance.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   calculating a hit percentage of an expected affinity for a first query, wherein the expected affinity comprises a first address range in a query plan cache;
   calculating a hit percentage of a candidate affinity for the first query, wherein the candidate affinity comprises a second address range in the query plan cache;
   comparing the hit percentage of the expected affinity for the first query and the hit percentage of the candidate affinity for the first query; and
   swapping, based on the hit percentage of the candidate affinity being greater than the hit percentage of the expected affinity by more than a threshold amount, query plans in the candidate affinity with query plans in the expected affinity.

2. The method of claim 1, further comprising:
   calculating an expected affinity for the first query, in response to receiving the first query.

3. The method of claim 2, further comprising:
   if a first query plan that implements the first query is found in the expected affinity, incrementing an expected affinity hit count for the first query and incrementing an expected affinity total count for the first query;
   if the first query plan that implements the first query is found in an unexpected affinity, incrementing the expected affinity total count for the first query; and
   if the first query plan that implements the first query is not found in the expected affinity and is not found in the unexpected affinity, creating the first query plan in the expected affinity, initializing the expected affinity hit count for the first query to one and initializing the expected affinity total count for the first query to one.

4. The method of claim 3, further comprising:
   if the first query plan that implements the first query is not found in the expected affinity and is not found in the unexpected affinity, determining a candidate affinity for the first query and initializing a candidate affinity hit count and a candidate affinity total count to zero.

5. The method of claim 4, further comprising:
   if the first query plan that implements the first query is found in the unexpected affinity and the unexpected affinity equals the candidate affinity, incrementing the candidate affinity hit count and incrementing the candidate total count for the first query; and
   if the first query plan that implements the first query is found in the unexpected affinity and the unexpected affinity does not equal the candidate affinity, incrementing the candidate total count for the first query but not incrementing the candidate affinity hit count for the first query.

6. The method of claim 5, wherein the calculating the hit percentage of the expected affinity for the first query further comprises:
   dividing the expected affinity hit count by the expected affinity total count.

7. The method of claim 5, wherein the calculating the hit percentage of the candidate affinity for the first query further comprises:
- dividing the candidate affinity hit count by the candidate affinity total count.

8. The method of claim 1, further comprising:
- moving the query plans in the expected affinity that have been accessed more recently than a first threshold time to a third address range within the first address range of the expected affinity; and
- moving the query plans in the expected affinity that have accessed less recently than a second threshold time to a fourth address range within the first address range of the expected affinity, wherein the third address range and the fourth address range are non-overlapping within the first address range.

9. A computer-readable storage medium encoded with instructions, wherein the instructions when executed comprise:
- calculating an expected affinity for a first query, in response to receiving the first query;
- calculating a hit percentage of an expected affinity for the first query, wherein the expected affinity comprises a first address range in a query plan cache;
- calculating a hit percentage of a candidate affinity for the first query, wherein the candidate affinity comprises a second address range in the query plan cache;
- comparing the hit percentage of the expected affinity for the first query and the hit percentage of the candidate affinity for the first query; and
- swapping, based on the hit percentage of the candidate affinity being greater than the hit percentage of the expected affinity by more than a threshold amount, query plans in the candidate affinity with query plans in the expected affinity.

10. The computer-readable storage medium of claim 9, further comprising:
- if a first query plan that implements the first query is found in the expected affinity, incrementing an expected affinity hit count for the first query and incrementing an expected affinity total count for the first query;
- if the first query plan that implements the first query is found in an unexpected affinity, incrementing the expected affinity total count for the first query; and
- if the first query plan that implements the first query is not found in the expected affinity and is not found in the unexpected affinity, creating the first query plan in the expected affinity, initializing the expected affinity hit count for the first query to one and initializing the expected affinity total count for the first query to one.

11. The computer-readable storage medium of claim 10, further comprising:
- if the first query plan that implements the first query is not found in the expected affinity and is not found in the unexpected affinity, determining a candidate affinity for the first query and initializing a candidate affinity hit count and a candidate affinity total count to zero.

12. The computer-readable storage medium of claim 11, further comprising:
- if the first query plan that implements the first query is found in the unexpected affinity and the unexpected affinity equals the candidate affinity, incrementing the candidate affinity hit count and incrementing the candidate total count for the first query; and
- if the first query plan that implements the first query is found in the unexpected affinity and the unexpected affinity does not equal the candidate affinity, incrementing the candidate total count for the first query but not incrementing the candidate affinity hit count for the first query.

13. The computer-readable storage medium of claim 12, wherein the calculating the hit percentage of the expected affinity for the first query further comprises:
- dividing the expected affinity hit count by the expected affinity total count.

14. The computer-readable storage medium of claim 12, wherein the calculating the hit percentage of the candidate affinity for the first query further comprises:
- dividing the candidate affinity hit count by the candidate affinity total count.

15. The computer-readable storage medium of claim 9, further comprising:
- moving the query plans in the expected affinity that have been accessed more recently than a first threshold time to a third address range within the first address range of the expected affinity; and
- moving the query plans in the expected affinity that have accessed less recently than a second threshold time to a fourth address range within the first address range of the expected affinity, wherein the third address range and the fourth address range are non-overlapping within the first address range.

16. A computer comprising:
- a processor; and
- memory communicatively connected to the processor, wherein the memory is encoded with instructions, and wherein the instructions when executed by the processor comprise
- calculating an expected affinity for a first query, in response to receiving the first query,
- calculating a hit percentage of an expected affinity for the first query, wherein the expected affinity comprises a first address range in a query plan cache,
- calculating a hit percentage of a candidate affinity for the first query, wherein the candidate affinity comprises a second address range in the query plan cache,
- comparing the hit percentage of the expected affinity for the first query and the hit percentage of the candidate affinity for the first query,
- swapping, based on the hit percentage of the candidate affinity being greater than the hit percentage of the expected affinity by more than a threshold amount, query plans in the candidate affinity with query plans in the expected affinity,
- if a first query plan that implements the first query is found in the expected affinity, incrementing an expected affinity hit count for the first query and incrementing an expected affinity total count for the first query,
- if the first query plan that implements the first query is found in an unexpected affinity, incrementing the expected affinity total count for the first query, and
- if the first query plan that implements the first query is not found in the expected affinity and is not found in the unexpected affinity, creating the first query plan in the expected affinity, initializing the expected affinity hit count for the first query to one and initializing the expected affinity total count for the first query to one.

17. The computer of claim 16, wherein the instructions further comprise:
- if the first query plan that implements the first query is not found in the expected affinity and is not found in the unexpected affinity, determining a candidate affinity for the first query and initializing a candidate affinity hit count and a candidate affinity total count to zero.

18. The computer of claim 17, wherein the instructions further comprise:
- if the first query plan that implements the first query is found in the unexpected affinity and the unexpected affinity equals the candidate affinity, incrementing the candidate affinity hit count and incrementing the candidate total count for the first query;
- if the first query plan that implements the first query is found in the unexpected affinity and the unexpected affinity does not equal the candidate affinity, incrementing the candidate total count for the first query but not incrementing the candidate affinity hit count for the first query;
- moving the query plans in the expected affinity that have been accessed more recently than a first threshold time to a third address range within the first address range of the expected affinity; and
- moving the query plans in the expected affinity that have accessed less recently than a second threshold time to a fourth address range within the first address range of the expected affinity, wherein the third address range and the fourth address range are non-overlapping within the first address range.

19. The computer of claim 18, wherein the calculating the hit percentage of the expected affinity for the first query further comprises:
- dividing the expected affinity hit count by the expected affinity total count.

20. The computer of claim 18, wherein the calculating the hit percentage of the candidate affinity for the first query further comprises:
- dividing the candidate affinity hit count by the candidate affinity total count.

* * * * *